Oct. 4, 1966 S. B. COHN 3,277,403
MICROWAVE DUAL MODE RESONATOR APPARATUS FOR EQUALIZING
AND COMPENSATING FOR NON-LINEAR PHASE ANGLE OR TIME
DELAY CHARACTERISTICS OF OTHER COMPONENTS
Filed Jan. 16, 1964 4 Sheets-Sheet 2
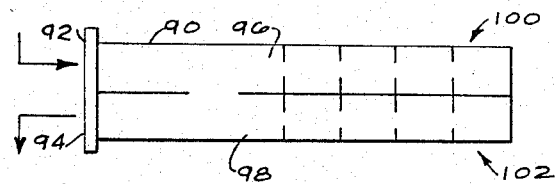
FIG. 5
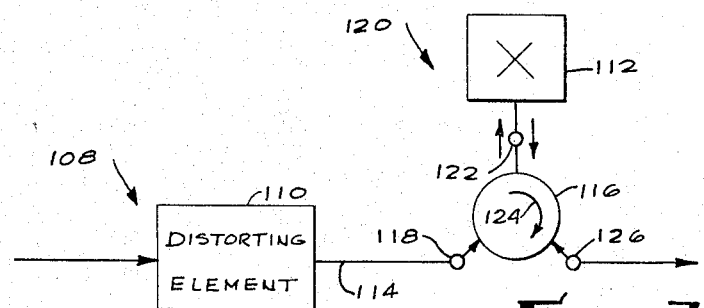
FIG. 7
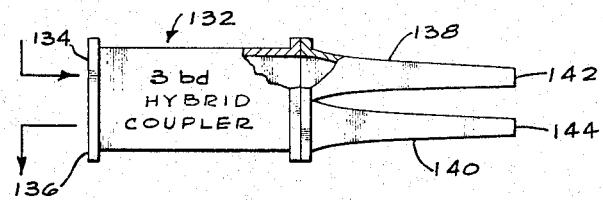
FIG. 8
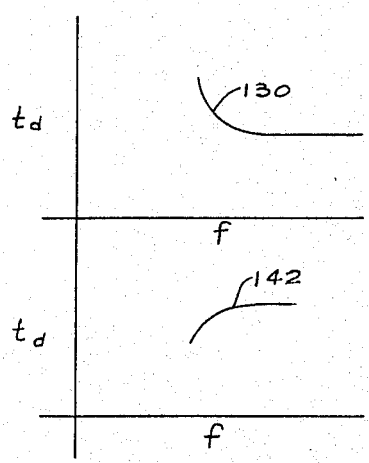
FIG. 9a
FIG. 9b
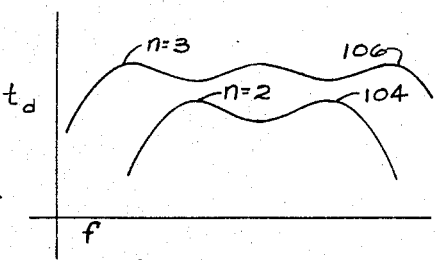
FIG. 6
INVENTOR.
SEYMOUR B. COHN
BY
Nilsson, Robbins & Anderson
ATTORNEYS.

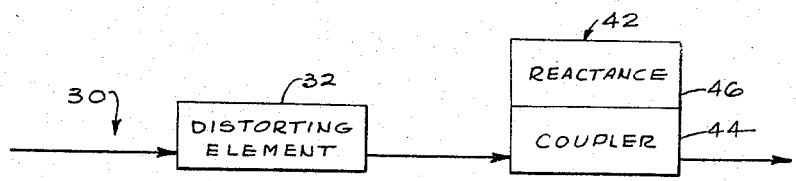
FIG. 1
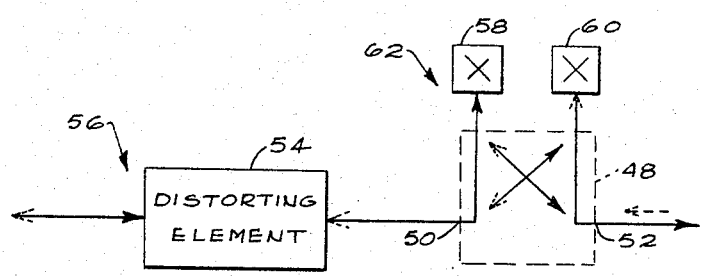
FIG. 3
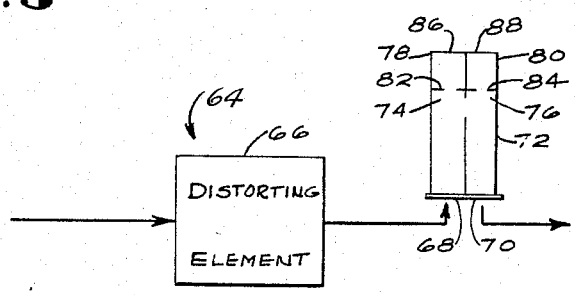
FIG. 4
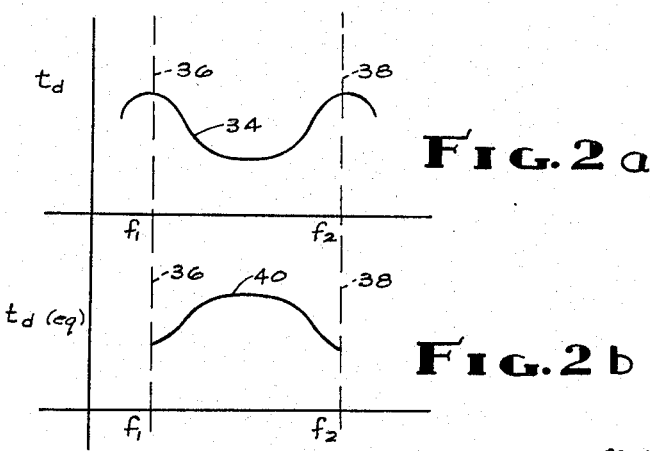
FIG. 2a
FIG. 2b
INVENTOR.
SEYMOUR B. COHN
BY
Nilsson, Robbins & Anderson
ATTORNEYS.

INVENTOR.
SEYMOUR B. COHN
BY
Nilsson, Robbins & Anderson
ATTORNEYS.

Oct. 4, 1966  S. B. COHN  3,277,403
MICROWAVE DUAL MODE RESONATOR APPARATUS FOR EQUALIZING
AND COMPENSATING FOR NON-LINEAR PHASE ANGLE OR TIME
DELAY CHARACTERISTICS OF OTHER COMPONENTS
Filed Jan. 16, 1964  4 Sheets-Sheet 4

INVENTOR.
SEYMOUR B. COHN
BY
Nilsson, Robbins & Anderson
ATTORNEYS.

United States Patent Office 3,277,403
Patented Oct. 4, 1966

3,277,403
MICROWAVE DUAL MODE RESONATOR APPARATUS FOR EQUALIZING AND COMPENSATING FOR NON-LINEAR PHASE ANGLE OR TIME DELAY CHARACTERISTICS OF OTHER COMPONENTS
Seymour B. Cohn, Hidden Hills, Calif., assignor, by mesne assignments, to Emerson Electric Company, St. Louis, Mo.
Filed Jan. 16, 1964, Ser. No. 338,262
6 Claims. (Cl. 333—28)

This invention relates generally to microwave circuitry and more particularly to a network and method for equalizing and compensating for nonlinear phase angle or time delay vs. frequency response.

Many electrical networks include components or elements in the signal path which inherently, either alone or in combination with the other circuit elements, cause the networks to exhibit a nonlinear transmission phase shift vs. frequency response. The same characteristic may be viewed as an unequal or nonconstant time delay suffered by different frequency components of the signal, since the derivative of the phase shift with respect to frequency is time delay. In other words if phase shift vs. frequency is linear over a given bandwidth the time delay (also known as group delay) will be constant over that bandwidth; and if the spectrum of a transmitted signal is included within the bandwidth, all its frequency components will be delayed uniformly by a magnitude of time equal to the slope of the phase shift "curve." In such a case, the signal leaving the output port will be identical to that which entered the input port except for the time delay, and the signal will have suffered no frequency or phase distortion. The circuit may exhibit, independently from these considerations, amplitude distortion over the bandwidth; however, such amplitude effects are generally not of serious concern and may usually be adequately minimized or eliminated with relative ease.

On the other hand, if the magnitude of time delay varies for different frequencies within the bandwidth, the relative phasing of the frequency components of the signal at the output will differ from that of the input pulse. The result is signal distortion wherein different frequency components of the signal are delayed by different amounts; and in fact, the time delay of the output signal with respect to the input signal is not a discrete value but must be defined in terms of a mean value over a particular portion of the bandwidth.

Because of the direct relationship between transmission phase shift and time delay these terms can be used interchangeably. However, the time delay parameter, for consistency, is used predominantly throughout the specification becaues it relates more directly to customary concepts of distortion.

Controlling the time delay characteristic of microwave electrical networks is becoming highly important in modern applications. This is particularly true in the sophisticated microwave systems currently being developed. For example, such signal distortion without correction or compensation, limits the amount and reliability of information transmitted in modern communication systems, and impairs the resolution and ranging accuracy of high performance radar systems.

As noted above, a curved phase response is inherent in many microwave circuit elements including some of the most common ones such as filters or lengthy runs of waveguide transmission lines.

Some attempts have been made in the microwave art in the past to solve this problem and these have generally been directed toward the utilization of time delay equalizing circuits in the IF amplifier circuits of the system. However, the overall results are not fully satisfactory in general, and in particular such techniques place an undesirably low limit on the system bandwidth and require extreme frequency stability.

Other attempts to solve the problem have been directed toward the embodiment of lumped constant circuit elements that provide varyingly satisfactory results at lower frequencies, but inherently suffer excessive losses at even the lowest frequencies of the microwave range.

Accordingly, it is an object of the present invention to provide a microwave system and method for providing time delay equalization which is not subject to these and other disadvantages of the prior art.

It is another object to provide such a system which is relatively non-complex and inexpensive and mechanically highly compact.

It is another object to provide such a system which is extremely versatile for adaptation to the needs of a very wide range of microwave utilizations, and for equalizing their non-constant time delay or phase shift vs. frequency curvature.

It is another object to provide such a system which is all-pass and which exhibits constant resistance, and is therefore reflectionless, over the desired bandwidth.

It is another object to provide such a system which is electrically passive.

The features of the present invention which are believed to be novel and patentable are set forth in the appended claims which form a part of the specification. For a better understanding of the invention, however, reference is made to the following description of the accompanying drawings in which:

FIG. 1 is a generalized block diagram of a time delay equalizing network constructed in accordance with the principles of the present invention;

FIG. 2a is a graph illustrating a time delay vs. frequency characteristic exhibited by a typical, unequalized microwave system;

FIGURE 2b is a graph illustrating a time delay vs. frequency curve of a time delay equalizer circuit of the invention;

FIG. 3 is a block diagram of an embodiment of the invention which includes a 3-db hybrid coupler and a pair of reactance elements;

FIG. 4 and FIG. 5 are diagrams of embodiments of the invention using a waveguide coupler and pairs of cavity reactance elements;

FIG. 6 is a graph of time delay vs. frequency illustrating the synthesis of complex, equalizing time delay vs. frequency functions;

FIG. 7 is a diagram of an alternative embodiment utilizing a circulator and a single reactance element;

FIG. 8 is a diagram of an embodiment of the invention utilizing tapered waveguide reactances;

FIG. 9a and FIG. 9b are time delay vs. frequency graphs illustrating that characteristic of a length of conventional waveguide and of the equalizing device of FIGURE 8 respectively;

Figure 10:
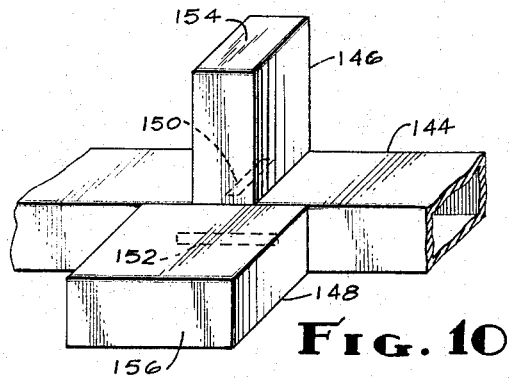
FIG. 10 is a perspective view of an embodiment of the invention incorporating a pair of resonant cavities.

With reference to the figures it is stressed that the particulars shown are by way of example and for purposes of illustrative discussion only and are presented in the cause of providing what is believed to be the most useful and readily understood description of the principles and structural concepts of the invention. Specifically, no attempt is made to show structural details of the apparatus in more detail than is necessary for a fundamental understanding of the invention. The description taken with the drawings will make apparent to those skilled in the microwave electronics art how the several forms of the invention may be embodied in practice. Furthermore, the particular showing, to the extent that it is of a detailed nature, is not to be taken as a limitation upon the scope of the invention which is defined, as indicated above, by the appended claims.

Briefly the objects of the invention are achieved in accordance with one example thereof by providing a microwave network which includes a 3-db directional coupler, a pair of the normal isolated ports of which are utilized as the input nad output ports of the time delay equalizer and which are coupled in cascade with the path or circuit to be equalized. The other two ports are terminated by identical impedances. Because of the quadrature phase and equal power split properties of the 3-db couplers the circuit is non-reflecting and the transmission coefficient is substantially identical to the reflection coefficient of the impedances. The transmission phase shift is simply the negative of the angle of the complex reflection coefficient of the impedances. When the impedances approximate pure reactances the circuit is nearly lossless and is particularly useful in the time delay equalizer. When the impedances are not pure reactances, dissipation loss occurs and the circuit is useful as an attenuation equalizer as well as a time delay equalizer.

The particular reactance selected is chosen to have a time delay response which is distorted from constant in a manner opposite to the distortion of the time delay curve of the remainder of the system being equalized. In a particular example, the 3-db coupler is a waveguide short slot hybrid two terminals of which are cooperatively coupled by irises to identical short circuited waveguide cavities having a Q and resonant frequency which are selected to provide time delay equalizing for the particular application.

If the system time delay characteristic to be equalized is complex or multi-valued or the like, the cavities at each of the hybrid terminals are repeated, or geometrically reiterated, in cascade, with adjacent ones thereof being designed for different Q's and resonant frequencies whereby the desired equalizing time delay characteristic is synthesized. Additionally or alternatively a plurality of the hybrid coupler-reactance circuits may be coupled in cascade or in separated portions of the signal path in the network to be equalized. In the latter case, as above, the different cascaded circuits are designed to synthesize the desired equalizing response. The process of synthesizing in either case is analogous to the familiar technique of stagger tuning cascaded amplifier stages to provide a desired overall bandpass characteristic. It should be noted, however, that the present equalization synthesis technique differs basically from the stagger tuning analogy in that the amplification characteristics of the active amplifier stages multiply in cascade whereas the passive time delay equalizer characteristics of cascaded equalizer circuits of the present invention add straightforwardly.

With reference now to the specific figures, in FIGURE 1, FIGURE 2a, and FIGURE 2b, a generalized microwave network 30 is indicated which includes a distorting component or element 32. In this example the element 32 may be considered as a conventional bandpass filter which typically exhibits a time delay characteristic indicated by the curve 34 of FIGURE 2a, which plots time delay on the ordinate vs. frequency along the abscissa with 3-db bandwidth being indicated by the dashed lines 36, 38 at $f_1$ and $f_2$ respectively. The fundamental approach of the invention is to "equalize" such a characteristic by exerting, on microwave signals traversing the network 30, a characteristic which is arithmetically the opposite of the curve 34, that is, the arithmetic sum of the two characteristics, as represented in the form of FIGURE 2, is a constant line parallel with the abscissa.

Such an equalizing characteristic is shown by the curve 40 of FIGURE 2b, which is a plot of time delay of the equalizer structure vs. frequency and is, for clarity, presented along the same frequency scale as utilized in FIGURE 2a. The function indicated by the curve 40, is generated by the equalizer circuit 42 of FIGURE 1, which is coupled electrically in cascade with the signal path through the network 30 including the time delay distorting element 32. As noted earlier the cascaded time delay functions simply add together and do not multiply with each other as do the gain characteristics of cascaded active amplifiers.

In the general embodiment of the invention as shown in FIGURE 1, the equalizer structure includes a coupler 44 which couples at least a portion of the energy from the microwave signals propagating along the indicated signal path to an impedance circuit 46. The microwave energy coupled thereto experiences a predetermined reactance and is transmitted, usually by reflection, back to the coupler 44, which directs it, as altered by the equalizing time delay characteristic of the reactance, again along the signal path of the network 30.

Referring to FIGURE 3, a more specific example of the invention is illustrated which includes a 3-db hybrid directional coupler 48 two "isolated" ports 50, 52, of which are coupled in cascade with distorting element 54, in a microwave network 56. The other two isolated ports of the coupler 48 are each coupled to identical reflective impedance elements 58, 60 respectively. Accordingly, energy traveling in the direction of the solid arrowheads in the figure passes through the distorting element 54 and is equally split into two portions one of which is impressed directly upon the impedance element 58 and the other of which suffers a quadrature phase shift and is then impressed upon the impedance element 60. The energy reflected from the impedance elements 58, 60 is then recombined at the output port 52 in phase, after that portion from the impedance element 58 also suffers quadrature phase shift.

The flow of microwave energy in the reverse direction is shown by the dotted arrowheads thus indicating that the system is reciprocal.

Because of the quadrature phase and equal power splitting properties of such 3-db couplers, the equalizer circuit 62 is nonreflecting extrinsically, and its transmission coefficient, neglecting the usually insignificant losses and phase shift of the coupler 48, is equal to the reflection coefficient of the impedance elements 58 or 60; and the transmission phase shift angle is equal to minus the reflection coefficient angle. Again, as mentioned above, when the impedance elements 58, 60 approximate pure reactances, which is readily achieved, the equalizer circuit 62 is substantially lossless and is particularly advantageous in a combination for synthesizing an arbitrary desired time delay characteristic.

Referring to FIGURE 4, an example of the equalizer circuit of FIGURE 3, in waveguide form is illustrated. Again a microwave network 64 which includes a distorting element 66 is shown. The isolated ports 68, 70 of a waveguide 3-db hybrid coupler 72 is coupled in cascade with the element 66 in the indicated signal path of the network 64. The opposite pair of isolated ports 74, 76 are each coupled to a waveguide resonant cavity 78, 80 through a coupling iris 82, 84, respectively. The ends 86, 88 of the cavity 78, 80 are short circuited as shown; and each cavity provides an essentially lossless element.

As an example of a method for designing the cavities 78, 80 for a particular utilization, the relationship of the electrical and, accordingly, geometrical parameters of the cavities to the desired equalizing time delay vs. equalizing function is derived by considering the lumped constant equivalent circuit of the cavity, which, taken at a proper reflection plane is a simple, parallel LC circuit. Thus the reflection coefficient $$\rho = \frac{Y_0 - jB}{Y_0 + jB}$$

where $Y_0$ is the magnitude of the admittance of the LC circuit at resonance, $j$ is the square root of $(-1)$, and $B$ is the magnitude of the algebraic sum of inductive and capacitive reactances of the equivalent circuit. Accordingly the transmission phase shift angle $$\phi = -\angle \rho = 2 \tan^{-1} \frac{B}{Y_0}$$

$$= 2 \tan^{-1}\left[\frac{\omega C - \frac{1}{\omega L}}{Y_0}\right]$$

If a narrow bandwidth is assumed, as is typically desirable, $$\omega C - \frac{1}{\omega L} = 2\omega_0 C \frac{\omega - \omega_0}{\omega_0}$$

and $$\phi = 2 \tan^{-1}\left[\frac{2\omega_0 C}{Y_0}\left(\frac{\omega - \omega_0}{\omega_0}\right)\right]$$

then since $$t_d = \frac{d\phi}{d\omega}$$

$$t_d = \frac{4C/Y_0}{1 + \left(\frac{2C}{Y_0}\right)^2 (\omega - \omega_0)^2}$$

and since the external Q of the cavity $$Q_{ex} = \frac{\omega_0 C}{Y_0}$$

$$t_d = \frac{\frac{2}{\pi} \frac{Q_{ex}}{f_0}}{1 + \left(2Q_{ex}\frac{f - f_0}{f_0}\right)^2}$$

Note that the time delay at resonance is $$t_{do} = \frac{2}{\pi} \frac{Q_{ex}}{f_0}$$

and that $$t_d = \frac{1}{2}t_{do} \text{ for } 2\frac{(f - f_0)}{f_0} = \frac{1}{Q_{ex}}$$

or $$(BW) = \frac{f_0}{Q_{ex}}$$

where (BW) is the frequency bandwidth at the ½ $t_d$ points.

Any number of such cavities may be coupled in series to form each of the identical pair of impedances, as illustrated in FIGURE 5, wherein there is shown a 3-db coupler 90 having circuit input and output ports 92, 94 respectively. Coupled to the ports 96, 98, opposite from the ports 92, 94, are identical cascaded series 100, 102 of reactive irises, waveguide cavities, and short circuits. The iris parameters, cavity lengths, and number of cavities are arbitrarily designed to provide a large variety of time delay versus frequency curves.

Alternatively, or additionally, any number of complete such equalizer circuits may be coupled in cascade with each other along the signal path of the network to be equalized, the total time delay characteristic being simply the sum of the individual time delay characteristics of the separate circuits which, ultimately, includes that of the networks to be equalized.

The graph of FIGURE 6, plotting time delay versus frequency, illustrates how a complex time-delay function is formed by cascading two equalizer circuits (curve 104) or three (curve 106) each of which, in either case, has different resonant frequencies and Q's. With reference back to FIGURE 2, it is clear that by this technique, and with these structures, the filter response, curve 34, may be equalized over substantially the entire pass band by an equalizer response thusly synthesized.

The finite dissipation in a cavity such as one of cavities 78, 80 of FIGURE 4, will result in a loss peak at $f_0$ equal to $$L = 8.686 \ln \frac{1}{|\rho|} \text{ db}$$

Extending the previous analysis, the loss at $f_0$ is approximately $$L = 17.37 \frac{Q_{ex}}{Q_u} \text{ db}$$

where $Q_u$ is the unloaded Q of the cavity and $Q_{ex}$ is the external Q of the cavity, and where $Q_{ex}$ is assumed to be much smaller than $Q_u$.

In a practical example for use in equalizing narrow-band filters, the loss at $f_0$ was set equal to 1 db, so that $Q_{ex} = Q_u/17.37$. The unloaded Q for the cavity, which was an X-band rectangular waveguide cavity, was 6000. Accordingly $Q_{ex} = 346$. The resonant frequency $f_0$ for the cavity was 10 gigacycles per second (gc.), and $$t_{do} = \frac{2}{\pi} \frac{346}{10(10)^9} = 22 \text{ nanoseconds (ns)}$$

and $$(BW) = \frac{10(10)^9}{346} = 28.9 \text{ mc.}$$

between the points where $$td = \frac{1}{2}t_{do}$$

Referring to FIGURE 7 an example of the invention is illustrated in which a network 108 to be equalized due to the phase distortion defects of a distorting element 110 includes a single impedance element 112 which may be similar to the single cavity 78 of FIGURE 4 or to the cascaded series of cavities 100 of FIGURE 5. The single impedance element 112 is coupled to the signal path 114 of the network 108 by means of a three-port circulator 116. The first port 118 of the circulator constitutes the input port for the equalizing circuit 120. Energy impingement thereon is coupled out of the circulator through the second port 122 as indicated by the sense of direction of rotation of the circulator arrow 124. The microwave energy which is transmitted out of the circulator 116 through the second port 122 is reflected back into the same port 122 by the reflective action of the impedance element 112. In conventional circulator manner the reflected energy thusly impresesd upon the port 122 is circulated to the output third port 126 of the circulator from whence it is propagated on toward a utilization device not shown.

It may be noted that although the example of the invention illustrated in FIGURE 7 utilizes a single impedance or reactance element thus giving assurance of an effective identical pair of reactance elements as analogized to the examples of the previous figures, the equalizing circuit 120 is not in this case reciprocal since energy impressed upon a port 126 of the circulator 116 would not in the first instance be transmitted out of the port 122 toward the reactance element; and, furthermore, the energy which does find its way to the reactance element will be reflected back into the port 122 from whence it will be circulated to the port 126 from whence, in this case, it came.

In FIGURE 8 with reference also to FIGURE 9a and FIGURE 9b an example of the invention is illustrated which is particularly useful for equalizing the time delay distortion defects of a lengthy run of waveguide transmission line. The curve 130 of the time delay vs. frequency graph of FIGURE 9a illustrates the nonconstant time delay function of such a lengthy run of rectangular waveguide. The curve 130 illustrates that the magnitude of time delay is a decreasing function of frequency.

In FIGURE 8 a 3-db hybrid coupler 132 is shown having a circuit input port 134 and output port 136. Coupled to opposite ports of the coupler are an identical pair of short lengths 138, 140 of tapered waveguide terminated at extreme ends 142, 144 by a short circuit as shown. Tapering is accomplished in the H plane, thus causing a varying cut off frequency along the lengths 138, 140. The decreasing width of the lengths of tapered waveguide results in a longitudinal variation in the position of cutoff for microwave signals depending on their frequency; that is, the lower frequencies will experience cutoff phenomenon near the left hand end, as viewed in the drawing, of the tapered lengths of waveguide, while the higher frequency components of the signals will suffer cutoff toward the right hand end of the lengths of tapered waveguide. Accordingly, the higher frequency components will travel a greater distance before they are reflected and directionally coupled out of the coupler 132. The higher frequency signals suffer a greater magnitude of time delay than will the lower frequency components.

A typical resultant curve 142, of FIGURE 9b, illustrating the time delay characteristic of such an equalizer circuit may be seen to be readily made to be arithmetically the opposite of the curve 130 of the lengthy run of the waveguide to be equalized. The particular shape of the time delay vs. frequency curve 142 may be controlled by the shape and length of the tapers. Furthermore, because the tapered lengths 138, 140 operate at and near cut off throughout the bandwidth of the equalizer circuits, large amounts of time delay equalization may be obtained for short tapers. A particular application of this form of the invention is shaping the time delay vs. frequency function of "chirp" radar systems the equalization for which has formerly been done in the IF channel thus placing, as indicated earlier, a severe limit on the bandwidth of the system and requiring extreme frequency stability.

Referring to the FIGURES 10 through 15 examples of the invention in addition to that shown in FIGURE 7 are illustrated which do not require the utilization of 3-db couplers.

In the example of FIGURE 10 a length of waveguide 144 is illustrated to which a pair of resonant cavities 146, 148 are aperture coupled, the former being series coupled through an elongated coupling slot 150 which is oriented transversely to the length of the waveguide 144, while the latter is shunt coupled through a coupling aperture 152 the length of which is oriented parallel to that of the length of waveguide 144. The series coupling slot 150 is formed across the width of the broad wall of the waveguide 144 while the shunt coupling slot 152 is disposed along the narrow wall of the waveguide 144. The ends 154, 156 of the cavities 146, 148 are short circuited as shown. Both of coupling slots 150, 152 are centered at the same longitudinal point along the length of waveguide 144.

In operation it may be observed that each of the cavities 146, 148 would, by itself, produce a severe reflection and attenuation peak at the resonant frequency. However, if the two cavities are coupled to the waveguide 144 with the same resonant frequency and loaded Q, reflectionless transmission along the length of waveguide 144 will result. This may be seen quite simply by considering that the series and shunt resonators in the equivalent circuit of the cavities are duals of each other. Therefore, their reflection coefficients are equal in magnitude but opposite in sign; and, accordingly, the reflection coefficients thus cancel at all frequencies. The all-pass nature of the equalizing structure illustrated in FIGURE 10 has been confirmed empirically and it may be shown that the time delay bandwidth and loss are given by the equations derived above.

Figure 11:
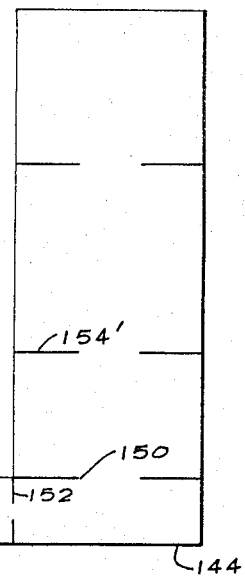
FIG. 11 is a schematic cross section of another example of the invention like that of FIGURE 10 in which the single cavities are geometrically reiterated so that each forms a series of intercoupled cavities.

In FIGURE 11 an example of the invention is illustrated in which the length of waveguide 144 is shown in cross section through the longitudinal point at which the series and shunt coupling slots 150, 152 are centered. Analogously to the example of the invention illustrated in FIGURE 5, a series of the resonator cavities 146' may be coupled in cascade through a series of appropriate irises coupled to the end wall 154'. Similarly a series of shunt coupled cavities 148' is shown coupled to appropriate irises coupled to the end wall 156'.

Figure 12:
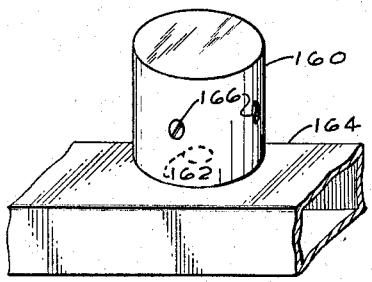
FIG. 12 and FIG. 13 and FIG. 14 are perspective views of examples of the invention which each include dual mode circularly polarized cavity reactance elements.

In FIGURE 12 a circularly polarized cavity configuration constructed in accordance with the principles of the invention is illustrated. In connection therewith it may be considered that the duals of the example of FIGURE 10 are incorporated into a single cavity adapted to support the contrarotating moments of circularly polarized microwave energy. A circular resonator cavity 160 is provided which is coupled through an aperture 162, concentric with the cylindrical axis thereof to an appropriate off-center position in the length of waveguide 164 where electromagnetic energy within the waveguide appears, in certain well known aspects, to be circularly polarized. Accordingly the coupled energy excites that mode of excitation in the resonator cavity 160. The overall design is similar to that of a waveguide directional filter except that the upper wall of the circular cavity is terminated by a short circuit as shown rather than by coupling into a second rectangular waveguide.

Here again the condition for all-pass operation is that the two orthogonal, linearly polarized modes have the same resonant frequency and Q and also that a quadrature relationship exist therebetween. In such case a circularly polarized wave may exist in the cavity for all frequencies, and the equations derived above again hold. For purposes of control and for assuring that the resonant frequencies and loaded Q's of the two orthogonal modes will be the same with no coupling between the two modes, a set of four or more tuning screws 166 are provided about the circular periphery of the cavity 160.

Figure 13:
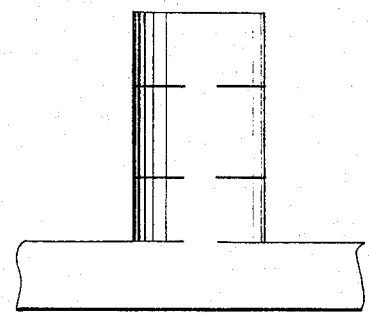

Referring to FIGURE 13 an example of the invention similar to that of FIGURE 12 is illustrated in which the circular resonator cavity 160 is geometrically reiterated, as shown, with coupling irises provided between the individual resonators of the connected series.

Figure 14:
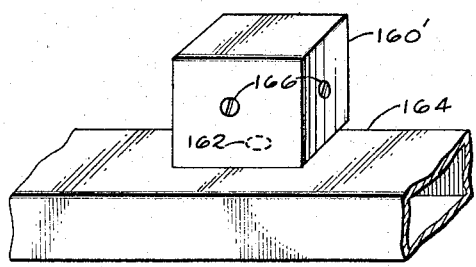

In FIGURE 14 a further example of the invention, similar to that of FIGURE 12, is illustrated in which the cavity thereof is a square resonator cavity 160' which is mounted to and coupled through the coupling aperture 162 to the length of waveguide 164. Again, tuning and loading screws 166 may be provided for control and versatility.

Figure 15:
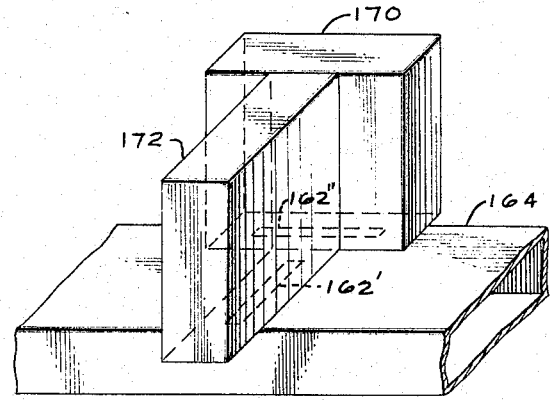
FIG. 15 is a perspective view of an alternative example of a time delay equalizing system constructed in accordance with the principles of the present invention.

In FIGURE 15 a still further example of the invention, analogous to that shown in FIGURE 12, is illustrated. In this example the length of waveguide 164 is provided with separate coupling slots 162' and 162" each of which couples to a different one of the quadrature phase circularly polarized components of the microwave energy traversing the length of the waveguide. Each of the coupling slots 162', 162" is coupled to identical resonant cavities 170, 172 which are duals of each other. The coupling apertures 162', 162" are centered at the same longitudinal point along the waveguide 164. In all functional respects other than that of the actual coupling mechanism, the example of the invention of FIGURE 15 is identical to that illustrated and discussed in connection with FIGURE 12.

Figure 16:
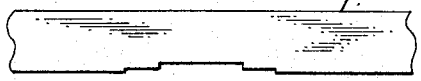

Referring to FIGURE 16, an embodiment of the invention is illustrated which, while constructed of strip line segments, is functionally analogous to those examples depicted in FIGURE 10 and FIGURE 15. Structurally the example of FIGURE 16 includes a length of strip transmission line 174, a broken-away portion of which is shown in the figure. Disposed longitudinally symmetrically about a reference coupling center point, not indicated, on the strip is a U-shaped, half wave length resonant strip segment 176. The U-shaped segment consists here of a base portion 178 which is disposed parallel to and is inductively series coupled to the line 174. Connected to each end of the portion 178 is a short length of strip line 180, 182, respectively, which is disposed at right angles to the line 174.

A half wave length linear resonant strip 184 is disposed on the opposite side of the line 174 and is oriented with its length perpendicular thereto and is also centered, longitudinally, about the imaginary coupling center point. The end 186 of the resonant strip 184 is capacitively, shunt, coupled to the transmission line 174 which may be relieved along its edge, as shown, to provide compensation for fringing fields. As in the waveguide cavity examples described above, conditions for reflectionless transmission along the line 174 include that the resonator strips have equal Q's and resonant frequencies.

Figure 17:
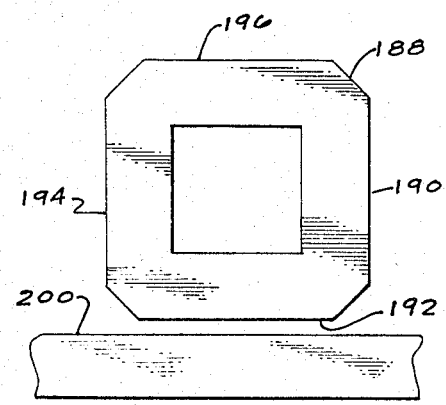
FIGS. 16 and 17 are schematic diagrams of microwave strip line examples of time delay equalizing networks according to the present invention.

In FIGURE 17 an example of a form of the invention is shown which is more directly analogous to those shown in FIGURE 12 and FIGURE 14. A closed loop resonator strip 188 is provided having four approximately equal side segments 190, 192, 194, 196 arranged in a square loop configuration with the segment 192 lying contiguously to and coplanarly with a length of strip transmission line 200. The total equivalent length around the loop resonator strip is a wavelength for the fundamental resonant frequency. The loop resonates in two modes, one wherein the center of the side strips is a voltage antinode which mode is excited by capacitive shunt coupling to the line 200, and the other wherein the side strip centers are current antinodes, which mode is excited by inductive, series coupling. Again the resonant frequencies and Q's associated with each mode are made to be equal as by the geometry of the strips including the corner mitering and the like.

It may be noted that the operation of the example of FIGURE 17 may also be viewed as a traveling wave loop resonator wherein the side strip segment 192 is wave coupled to the line 200 with high backward wave directivity. The conditions for high directivity, viz, that $\sqrt{Z_{oe}Z_{oo}}$ is equal to the characteristic impedance of the line 200, where $Z_{oe}$ and $Z_{oo}$ are the characteristic impedances of the even and odd mode excitations associated with the coupling between the strip line 200 and the segment 192. It may further be noted that the relationships expressed by the formulas given earlier for time delay and bandwidth are basically valid for the strip line cases except that instead of being functions of $Q_{ex}$, they are functions of the coupling between strip line segments.

There have thus been disclosed and described a number of examples of a microwave equalizer network which exhibits the advantages and achieves the objects set forth hereinabove.

What is claimed is:

1. In a microwave network having a signal path of the character including at least one element interposed therein which causes said signal path to exhibit a non-constant time delay vs. frequency characteristic on signals in a predetermined frequency band traversing said signal path, a time delay equalizing circuit combined in said path electrically in cascade with said at least one element and comprising:
a length of rectangular wave guide including coupling means comprising a portion of one of the broad walls thereof which is apertured in a position between its center and one of its narrow walls for circular polarization excitation coupling to waveguide orthogonal modes of propagation of the microwave energy along said length of rectangular waveguide; and
impedance means comprising a dual mode circularly polarized cavity structure coupled to said apertured broad wall and characterized by having a short circuited end disposed oppositely from said apertured broad wall and by having a Q (loaded) and resonant frequency to provide a time delay vs. frequency characteristic which substantially equalizes said time delay characteristic of said network, whereby the circularly polarized excitation of said cavity constitutes dual modes in quadrature phase relation with each other which are coupled to said waveguide modes of propagation by said coupling means.

2. The claim according to claim 1 in which said dual mode circularly polarized cavity structure is a cylindrical cavity with one end concentrically coupled to the aperture of said apertured broad wall and having a plurality of tuning screws spaced about the cylindrical circumference of said cavity for tuning two orthogonal modes of the circular polarization to the same resonant frequency and Q (loaded).

3. The invention according to claim 1 in which said circularly polarized cavity structure is a square waveguide cavity structure disposed with one square end coupled to the aperture of the said apertured broad wall and having an opposite square end which is short circuited.

4. In a microwave network of the character including at least one circuit element which causes a network to exhibit a non-constant time delay vs. frequency characteristic on microwave signals traversing along a predetermined signal path therein, the combination therein of a time delay equalizing network comprising:
a length of microwave transmission strip line connected in cascade with said at least one circuit element in said predetermined signal path of said network;
a first half-wave length resonant strip line element inductively coupled to said strip line at a predetermined longitudinal location on said length of strip line and disposed laterally to a first side thereof in an electromagnetic series coupled relation therewith; and
a second half-wave length resonant strip line element capacitively coupled to said strip line at said predetermined longitudinal location on said length of strip line and disposed laterally to the opposite side thereof in an electromagnetically shunt coupled relationship therewith,
said first and second half wave length resonant elements having predetermined, substantially equal Q's (loaded) and resonant frequencies, whereby said series and shunt coupled resonant strip line elements are of the character to be excited by microwave energy propagating along said length of microwave strip transmission line in modes of oscillation which are in quadrature phase relationship with each other.

5. The claim according to claim 4 in which said inductively coupled first half wave length resonant strip line element comprises a U-shaped segment disposed coplanarly with said length of strip line and having its base member disposed contiguously thereto and parallel therewith and having its leg portions projecting perpendicularly away therefrom, and in which said capacitively coupled second half wave length resonant strip line element comprises an elongated strip line segment disposed coplanarly with said length of strip line with one end disposed contiguously thereto and its length oriented perpendicularly thereto.

6. A microwave strip line, time delay equalizing circuit for use in combination with a microwave network which without equalization exerts on microwave signals propagated along a predetermined signal path thereof a non-constant time delay vs. frequency characteristic, and comprising:

a length of microwave transmission strip line connected in cascade with said predetermined signal path; and a closed loop strip line resonator disposed coplanarly with said length of strip line and having a portion of its perimeter disposed contiguously to, in a predetermined electro-magnetic coupling relationship therewith, said strip line resonator having a predetermined resonant frequency for two fundamental modes of oscillation around said closed loop resonator for equalizing said non-constant time delay characteristic of said network, said modes of oscillation being of equal frequency and Q (loaded) and being in quadrature phase relationship with respect to each other, one of said modes being electrically coupled to signals propagating along said length of microwave transmission strip line and the other being magnetically coupled thereto.

References Cited by the Examiner

UNITED STATES PATENTS

| 2,649,576 | 8/1953 | Lewis | 333—11 |
| 2,863,126 | 12/1958 | Pierce | 333—28 |

FOREIGN PATENTS

| 1,359,881 | 3/1964 | France. |

OTHER REFERENCES

Proceedings of the IRE, August 1956. "Directional Channel-Separation Filters" by S. B. Cohn and F. S. Coale, pages 1018–1024.

HERMAN KARL SAALBACH, *Primary Examiner.*

R. D. COHN, *Assistant Examiner.*